US010753228B2

(12) United States Patent
Wiedenhoefer et al.

(10) Patent No.: US 10,753,228 B2
(45) Date of Patent: Aug. 25, 2020

(54) SYSTEM FOR REMOVING HEAT FROM TURBOMACHINERY COMPONENTS

(71) Applicant: General Electric Company, Schenectady, NY (US)

(72) Inventors: James Fredric Wiedenhoefer, Clifton Park, NY (US); James Albert Tallman, Scotia, NY (US); Brian Gene Brzek, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 656 days.

(21) Appl. No.: 15/234,588

(22) Filed: Aug. 11, 2016

(65) Prior Publication Data

US 2018/0045073 A1 Feb. 15, 2018

(51) Int. Cl.
*F01D 25/12* (2006.01)
*F01D 5/18* (2006.01)
(Continued)

(52) U.S. Cl.
CPC ............ *F01D 25/12* (2013.01); *F01D 5/183* (2013.01); *F01D 5/186* (2013.01); *F01D 9/041* (2013.01);
(Continued)

(58) Field of Classification Search
CPC .......... F01D 25/12; F01D 25/14; F01D 25/24; F01D 5/183; F01D 5/186; F01D 5/187;
(Continued)

(56) References Cited

U.S. PATENT DOCUMENTS 3,240,468 A * 3/1966 Watts ...................... F01D 5/183
415/115
3,673,802 A * 7/1972 Krebs ...................... F02C 3/067
60/226.1

(Continued)

OTHER PUBLICATIONS

Yuan et al., "Thermal Analysis of High Power LED Array Packaging with Microchannel Cooler", Electronic Packaging Technology, 2006. ICEPT '06. 7th International Conference on, pp. 1-5, Aug. 26-29, 2006, Shanghai.

(Continued)

*Primary Examiner* — Mark A Laurenzi
*Assistant Examiner* — Loren C Edwards
(74) *Attorney, Agent, or Firm* — Armstrong Teasdale LLP

(57) ABSTRACT

A turbomachinery component for a turbomachine includes feed manifold, a return manifold and a sidewall. The feed manifold is configured to receive a coolant stream therein and includes a plurality of feed plenums. The return manifold includes a plurality of return plenums. The sidewall defines a plurality of feed channels and a plurality of return channels therein. The sidewall further includes an inner surface and an outer surface opposite the inner surface. Each feed channel is in fluid communication with at least one of the feed plenums. Each return channel is in fluid communication with at least one of the return plenums. The sidewall further at least partially defines a plurality of microchannels. Each microchannel is in fluid communication with one of the feed channels and one of the return channels.

20 Claims, 6 Drawing Sheets

(51) Int. Cl.
*F01D 9/04* (2006.01)
*F01D 25/14* (2006.01)
*F01D 25/24* (2006.01)
*F02C 3/04* (2006.01)
*F04D 29/52* (2006.01)
*F04D 29/54* (2006.01)
*F04D 29/58* (2006.01)

(52) U.S. Cl.
CPC .............. *F01D 25/14* (2013.01); *F01D 25/24* (2013.01); *F02C 3/04* (2013.01); *F04D 29/522* (2013.01); *F04D 29/542* (2013.01); *F04D 29/545* (2013.01); *F04D 29/582* (2013.01); *F05D 2220/32* (2013.01); *F05D 2240/35* (2013.01); *F05D 2260/202* (2013.01); *F05D 2260/204* (2013.01); *Y02T 50/676* (2013.01)

(58) Field of Classification Search
CPC .......... F01D 9/041; F02C 3/04; F04D 29/522; F04D 29/542; F04D 29/545; F04D 29/582; F05D 2220/32; F05D 2240/35; F05D 2260/202; F05D 2260/204; Y02T 50/676
USPC .......................................................... 60/806
See application file for complete search history.

(56) References Cited

U.S. PATENT DOCUMENTS

| | | | |
|---|---|---|---|
| 7,334,630 B2 | 2/2008 | Goodson et al. | |
| 7,556,476 B1 | 7/2009 | Liang | |
| 7,717,675 B1 * | 5/2010 | Liang | F01D 5/187 |
| | | | 415/115 |
| 7,717,677 B1 * | 5/2010 | Liang | F01D 5/183 |
| | | | 415/115 |
| 8,109,726 B2 | 2/2012 | Liang | |
| 9,015,944 B2 | 4/2015 | Lacy et al. | |
| 9,151,179 B2 | 10/2015 | Lacy et al. | |
| 9,297,262 B2 | 3/2016 | Zhang et al. | |
| 2014/0170433 A1 * | 6/2014 | Schick | B22F 7/08 |
| | | | 428/548 |
| 2014/0360155 A1 | 12/2014 | Weber et al. | |
| 2015/0218962 A1 | 8/2015 | Weber et al. | |

OTHER PUBLICATIONS

Fryer Jack et al., "Microtextured Surfaces for Turbine Blade Impingement Cooling", NASA Technical Reports Server (NTRS), 1 Page, Nov. 1, 2014.

* cited by examiner

SYSTEM FOR REMOVING HEAT FROM TURBOMACHINERY COMPONENTS

BACKGROUND

The field of the disclosure relates generally to turbomachinery and, more specifically, to systems for removing heat from turbomachinery components.

In at least some known gas turbine engines, air is pressurized in a compressor and mixed with fuel in a combustor for generating a stream of high-temperature combustion gases. Energy is extracted from the gas stream in a turbine which powers a mechanical load. During operation of the gas turbine engine, various hot gas path components are subjected to the high-temperature gas stream, which can induce wear in the hot gas path components. Generally, higher temperature gases increase performance, efficiency, and power output of the gas turbine engine. Thus, at least some known hot gas path components are cooled to facilitate the gas turbine engine to operate with the increased high-temperature combustion gas streams.

Some known hot gas path components include an airfoil with a cooling system, such that a coolant stream, typically composed of bleed air extracted from the compressor, is forced through internal cooling passages defined within the airfoil. The air is then discharged through cooling holes or passages located at an outer surface of the airfoil to transfer heat away from the hot gas path component. This forced air cooling facilitates the hot gas path components functioning in the high-temperature gas stream. Although some known cooling systems include internal cooling passages, such known cooling systems are generally inadequate at facilitating even or targeted cooling of the airfoil. For example, such known systems generally include long, unidirectional internal cooling passages that generally do not permit reclamation of warmed portions of the coolant stream until well after the cooling capacity of the coolant stream has been significantly diminished. As a result, portions of the airfoil do not receive adequate cooling and are prone to undesirable induced temperature gradients. Such temperature gradients result in suboptimal cooling and efficiency of the airfoil.

BRIEF DESCRIPTION

In one aspect, a turbomachinery component is provided. The turbomachinery component includes a feed manifold, a return manifold, and a sidewall. The feed manifold is configured to receive a coolant stream therein and includes a plurality of feed plenums. The return manifold includes a plurality of return plenums. The sidewall defines a plurality of feed channels and a plurality of return channels therein. The sidewall includes an inner surface and an outer surface opposite the inner surface. Each feed channel of the plurality of feed channels is in fluid communication with at least one feed plenum of the plurality of feed plenums. Each return channel of the plurality of return channels is in fluid communication with at least one return plenum of the plurality of return plenums. The sidewall further at least partially defines a first plurality of microchannels adjacent the outer surface, each microchannel of the first plurality of microchannels in fluid communication with one feed channel of the plurality of feed channels and one return channel of the plurality of return channels.

In another aspect, a system is provided for removing heat from a turbomachinery component. The turbomachinery component includes a sidewall that further includes an inner surface and an outer surface opposite the inner surface, a feed manifold configured to receive a coolant stream therein, the feed manifold including a plurality of feed plenums, and a return manifold, the return manifold including a plurality of return plenums. The system includes a plurality of feed channels and a plurality of return channels defined by the sidewall. Each feed channel of the plurality of feed channels is in fluid communication with at least one feed plenum of the plurality of feed plenums. Each return channel of the plurality of return channels is in fluid communication with at least one return plenum of the plurality of return plenums. The system further includes a first plurality of microchannels adjacent the outer surface and at least partially defined by the sidewall. Each microchannel of the first plurality of microchannels is in fluid communication with one feed channel of the plurality of feed channels and one return channel of the plurality of return channels.

In still another aspect, a turbomachine is provided. The turbomachine includes a compressor, a turbine rotatably coupled to the compressor, a combustor couple in flow communication with the compressor and the turbine, and at least one turbomachinery component coupled to the turbine. The turbomachinery component further includes a feed manifold, a return manifold, and a sidewall. The feed manifold is configured to receive a coolant stream therein and includes a plurality of feed plenums. The return manifold includes a plurality of return plenums. The sidewall defines a plurality of feed channels and a plurality of return channels therein. The sidewall includes an inner surface and an outer surface opposite the inner surface. Each feed channel of the plurality of feed channels is in fluid communication with at least one feed plenum of the plurality of feed plenums. Each return channel of the plurality of return channels is in fluid communication with at least one return plenum of the plurality of return plenums. The sidewall further at least partially defines a first plurality of microchannels adjacent the outer surface, each microchannel of the first plurality of microchannels in fluid communication with one feed channel of the plurality of feed channels and one return channel of the plurality of return channels.

DRAWINGS

These and other features, aspects, and advantages of the present disclosure will become better understood when the following detailed description is read with reference to the accompanying drawings in which like characters represent like parts throughout the drawings, wherein.

Figure 1:
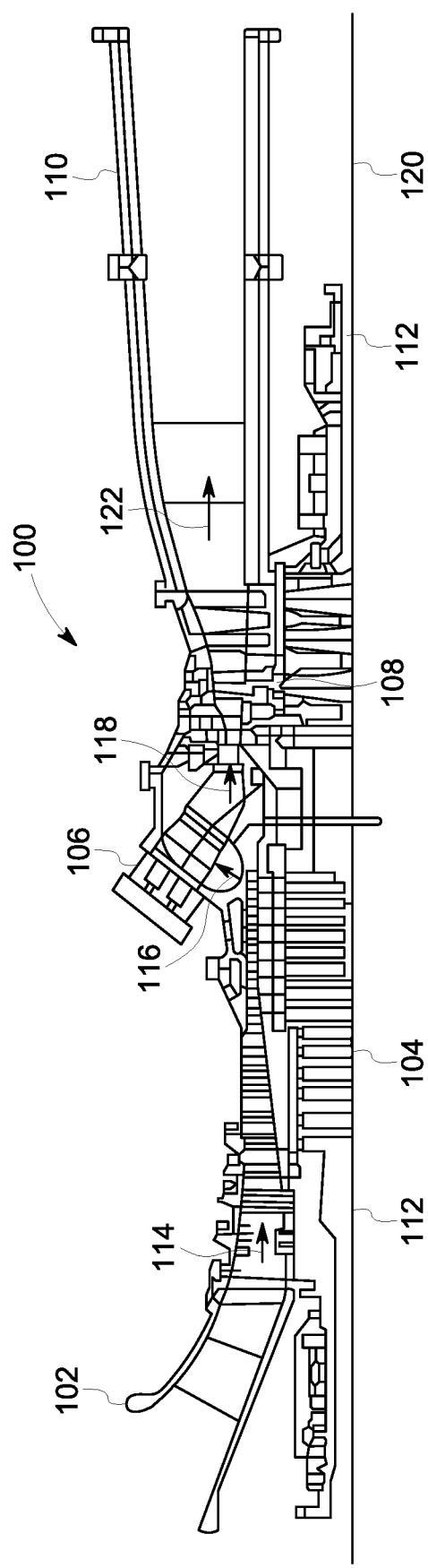
FIG. 1 is a schematic illustration of an exemplary gas turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations extending substantially parallel to a longitudinal axis of a gas turbine engine. Moreover, the terms "radial" and "radially" refer to directions and orientations extending substantially perpendicular to the longitudinal axis of the gas turbine engine. In addition, as used herein, the terms "circumferential" and "circumferentially" refer to directions and orientations extending arcuately about the longitudinal axis of the gas turbine engine.

Embodiments of the present disclosure relate to systems for removing heat and providing cooling for turbomachinery components. Specifically, in the exemplary embodiment, a turbomachinery component that includes a cooling system within a sidewall of the turbomachinery component is provided. The cooling system includes a series of capillary-like internal cooling passages configured to deliver a stream of coolant to microchannels adjacent an outer surface of the sidewall. Microchannel cooling significantly reduces cooling requirements by placing the coolant stream as close as possible to the region to be cooled. For example, in the case of an airfoil of a gas turbine, the outer surface of the airfoil is directly exposed to a hot gas path. Accordingly, in the exemplary embodiment, in which the turbomachinery component is an airfoil, microchannels are disposed adjacent the outer surface of the airfoil. Generally, the term "microchannel" encompasses channels having approximate depths and widths in the range of 0.1 mm to 3.0 mm.

The capillary-like structure of the exemplary embodiment has several advantages over known cooling systems. Use of microchannels to direct the coolant stream adjacent the outer surface facilitates efficient heat exchange between the microchannels and the outer surface of the airfoil. Also, the exemplary embodiment further facilitates the use of short microchannels that portions of the coolant stream that pass through a given microchannel are readily reclaimed after heat exchange has occurred. As a result, the size and variation of induced temperature gradients in the airfoil are reduced. Further, the capillary-like structure facilitates variation in the quantity and arrangement of microchannels adjacent the outer surface of the airfoil sidewall. As a result, additional microchannels may be positioned adjacent portions of the airfoil sidewall subject to higher temperatures during operation.

FIG. 1 is a schematic view of a rotary machine 100, i.e., a turbomachine, and more specifically, a turbine engine. In the exemplary embodiment, turbine engine 100 is a gas turbine engine. Alternatively, turbine engine 100 is any other turbine engine and/or rotary machine, including, and without limitation, a steam turbine engine, an aircraft engine, a wind turbine, and a compressor. In the exemplary embodiment, gas turbine engine 100 includes an air intake section 102, and a compressor section 104 that is coupled downstream from, and in flow communication with, intake section 102. A combustor section 106 is coupled downstream from, and in flow communication with, compressor section 104, and a turbine section 108 is coupled downstream from, and in flow communication with combustion section 106. Downstream from turbine section 108 is an exhaust section 110. Moreover, in the exemplary embodiment, turbine section 108 is rotatably coupled to compressor section 104 through a rotor assembly 112.

In operation, air intake section 102 channels air 114 towards compressor section 104. Compressor section 104 compresses inlet air 114 to higher pressures prior to discharging compressed air 116 towards combustor section 106. Compressed air 116 is channeled to combustor section 106 where it is mixed with fuel (not shown) and burned to generate high temperature combustion gases 118. Combustion gases 118 are channeled downstream towards turbine section 108, such that after impinging turbine blades (not shown) thermal energy is converted to mechanical rotational energy that is used to drive rotor assembly 112 about a longitudinal axis 120. Often, combustor section 106 and turbine section 108 are referred to as a hot gas section of turbine engine 100. Exhaust gases 122 then discharge through exhaust section 110 to ambient atmosphere.

Figure 2:
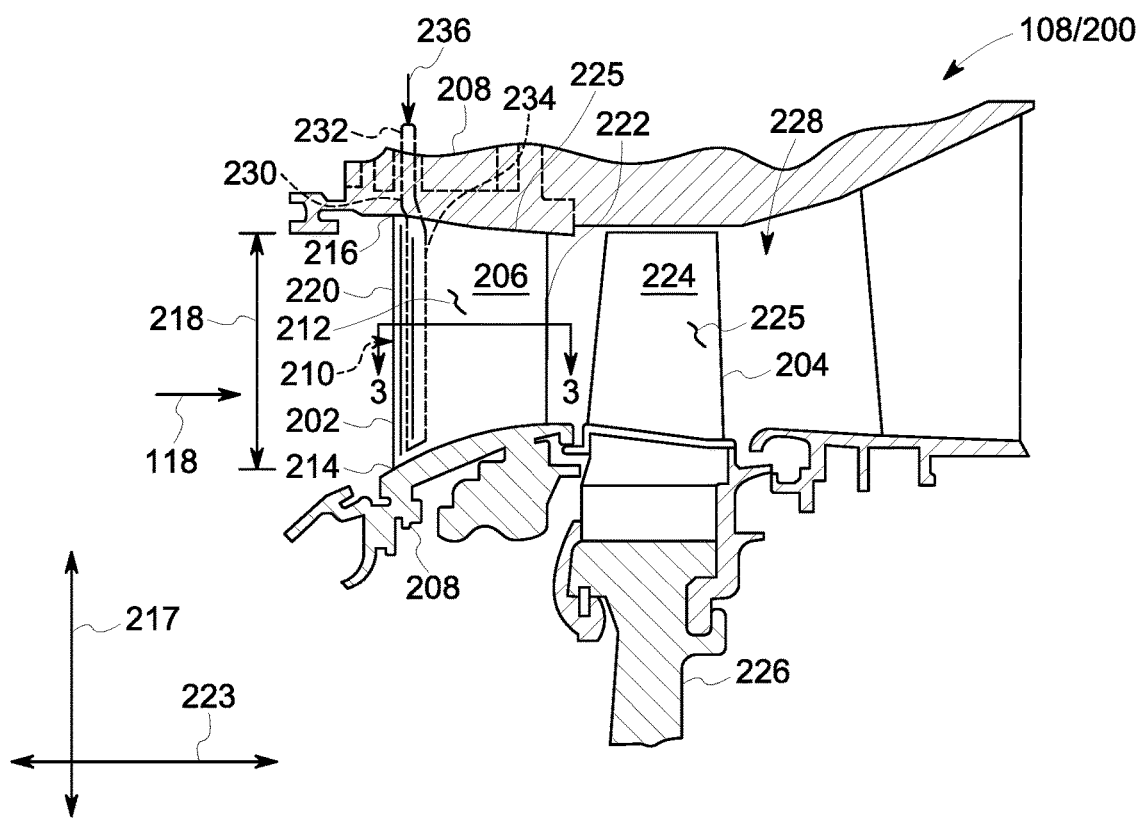
FIG. 2 is an enlarged schematic view of an exemplary first turbine stage of the gas turbine engine shown in FIG. 1.

FIG. 2 is an enlarged schematic view of an exemplary first turbine stage 200 of turbine engine 100 (shown in FIG. 1). In the exemplary embodiment, turbine section 108 includes a plurality of stator vanes 202 circumferentially spaced around longitudinal axis 120 (shown in FIG. 1) and a plurality of turbine blades 204 also circumferentially spaced around longitudinal axis 120. A row of stator vanes 202 and a row of turbine blades 204 form a turbine stage, for example first turbine stage 200, that is the first turbine stage downstream of combustor section 106 (shown in FIG. 1). Although a single turbine stage 200 is shown in FIG. 2, turbine section 108 may include any number of axially spaced turbine stages.

In the exemplary embodiment, stator vane 202 includes an airfoil 206 that is coupled to a turbine casing 208. Airfoil 206 includes a pressure sidewall 210 coupled to an opposite suction sidewall 212. Pressure sidewall 210 and suction sidewall 212 extend from a root 214 to an opposite tip 216 that defines a radial direction 217 such that airfoil 206 has a radial length 218 which extends in radial direction 217. Pressure sidewall 210 and suction sidewall 212 also define a leading edge 220 and an opposing trailing edge 222. Leading edge 220 and trailing edge 222 define a longitudinal direction 223. Additionally, turbine blade 204 includes an airfoil 224 coupled to rotor assembly 112 (shown in FIG. 1) through a disk 226. Each airfoil 206 and 224 is coated with a layer 225 of a thermal bond coating (TBC). TBC layer 225 is formed on each airfoil 206 and 224 for increased protection against high temperature combustion gases 118.

During operation of turbine engine 100 (shown in FIG. 1), stator vane 202 and turbine blade 204 are positioned within a hot gas flow path 228 of turbine casing 208, such that a flow of high temperature combustion gases 118 is channeled therethrough, exposing outer surfaces of stator vane airfoil 206 and turbine blade airfoil 224 to high temperatures and potential corresponding thermal stresses and/or thermal degradation. In the exemplary embodiment, hot gas flow path 228 is at least partially defined by turbine casing 208, stator vane airfoil 206, and turbine blade airfoil 224. In addition, hot gas flow path 228 is further defined by turbomachinery components, including, without limitation, end walls, shrouds, guide vanes, and nozzles (none shown). To at least partially address such thermal exposure, stator vane airfoil 206 and/or any other hot gas section component includes a cooling system 230. Cooling system 230 includes a cooling supply passage 232, defined in turbine casing 208, coupled in flow communication with at least one cooling passage 234 defined within stator vane airfoil 206. A stream of coolant fluid 236 is channeled through cooling system 230 through a coolant stream source (not shown) to facilitate removing heat from airfoil 206 and maintaining a consistent and uniform temperature gradient of airfoil 206 to increase component efficiency. In the exemplary embodiment, coolant fluid 236 includes pressurized bleed air from compressor section 104 (shown in FIG. 1). Although air is specifically described, in alternative embodiments a fluid other than air may be used to cool components exposed to combustion gases 118. The term fluid as used herein includes any medium or material that flows, including, but not limited to, gas, steam, and air.

Figure 3:
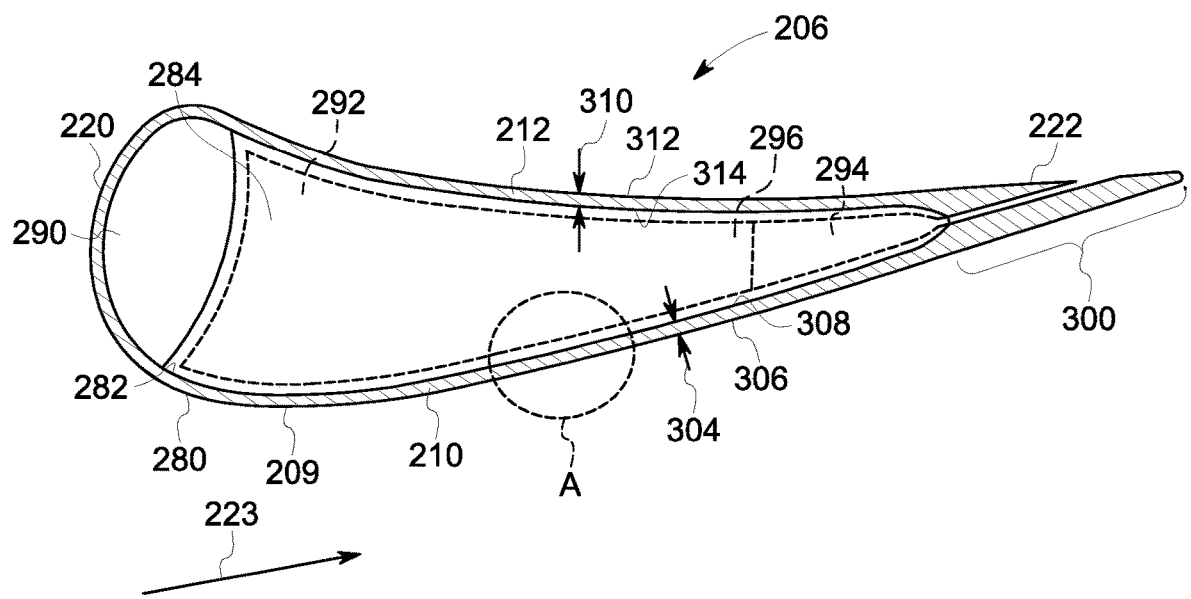
FIG. 3 is a cross-sectional view of an exemplary turbomachinery component, more specifically, an airfoil of FIG. 2, taken along line 3-3 (shown in FIG. 2)

FIG. 3 is a cross-sectional view of an exemplary turbomachinery component, more specifically, an airfoil 206 taken along line 3-3 (shown in FIG. 2). In the exemplary embodiment, airfoil 206 includes an airfoil sidewall 209. Airfoil sidewall 209 generally includes an outer surface 280 that is exposed to combustion gases 118 (shown in FIGS. 1 and 2) and an opposite inner surface 282 defining an internal airfoil volume 284. Airfoil sidewall 209 is generally separable into a pressure sidewall 210 and a suction sidewall 212, the pressure sidewall 210 and the suction sidewall 212 coupled at trailing edge 222. Specifically, pressure sidewall 210 and suction sidewall 212 progressively taper towards each other to form a trailing edge section 300 such that each of suction sidewall 212 and pressure sidewall 210 are coupled to each other. Pressure sidewall 210 includes a substantially uniform thickness 304 with an outer surface 306 that is exposed to combustion gases 118 (shown in FIGS. 1 and 2) and an opposite inner surface 308. Similarly, suction sidewall 212 includes a substantially uniform thickness 310 with an outer surface 312 that is exposed to combustion gases 118 and an opposite inner surface 314. Pressure sidewall 210 and suction sidewall 212 also define a leading edge 220 opposite trailing edge 222. Leading edge 220 and trailing edge 222 define longitudinal direction 223.

Airfoil 206 is configured to receive a stream of coolant fluid via a cooling system 230 (shown in FIG. 2). More specifically, the stream of coolant provided by cooling system 230 enters airfoil 206 and is distributed through a feed manifold 290. In the exemplary embodiment, feed manifold 290 partially occupies internal airfoil volume 284. Feed manifold 290 includes a plurality of feed plenums, such as feed plenum 292, which extend through internal airfoil volume 284 and facilitate delivery of portions of the steam of coolant fluid to airfoil sidewall 209. In the exemplary embodiment, feed manifold 290 is configured to deliver portions of the stream of coolant fluid to various sections of airfoil sidewall 209 including sections of pressure sidewall 210, suction sidewall 212, and leading edge 220. Airfoil 206 further includes a return manifold 294 including a plurality of return plenums, such as return plenum 296. Return manifold 294 is configured to facilitate return of the stream of coolant fluid after it has been used to cool portions of airfoil sidewall 209.

In the exemplary embodiment, airfoil 206 includes one feed manifold 290 and one return manifold 294 configured to supply and return a stream of coolant fluid, respectively. In other embodiments, turbomachinery components may include more than one feed manifold and/or return manifold. For example, in certain embodiments, a turbomachinery component may include a first feed manifold and a first return manifold for cooling a first sidewall section of the turbomachinery component and a second feed manifold and a second return manifold for cooling a second sidewall section of the turbomachinery component.

Figure 4:
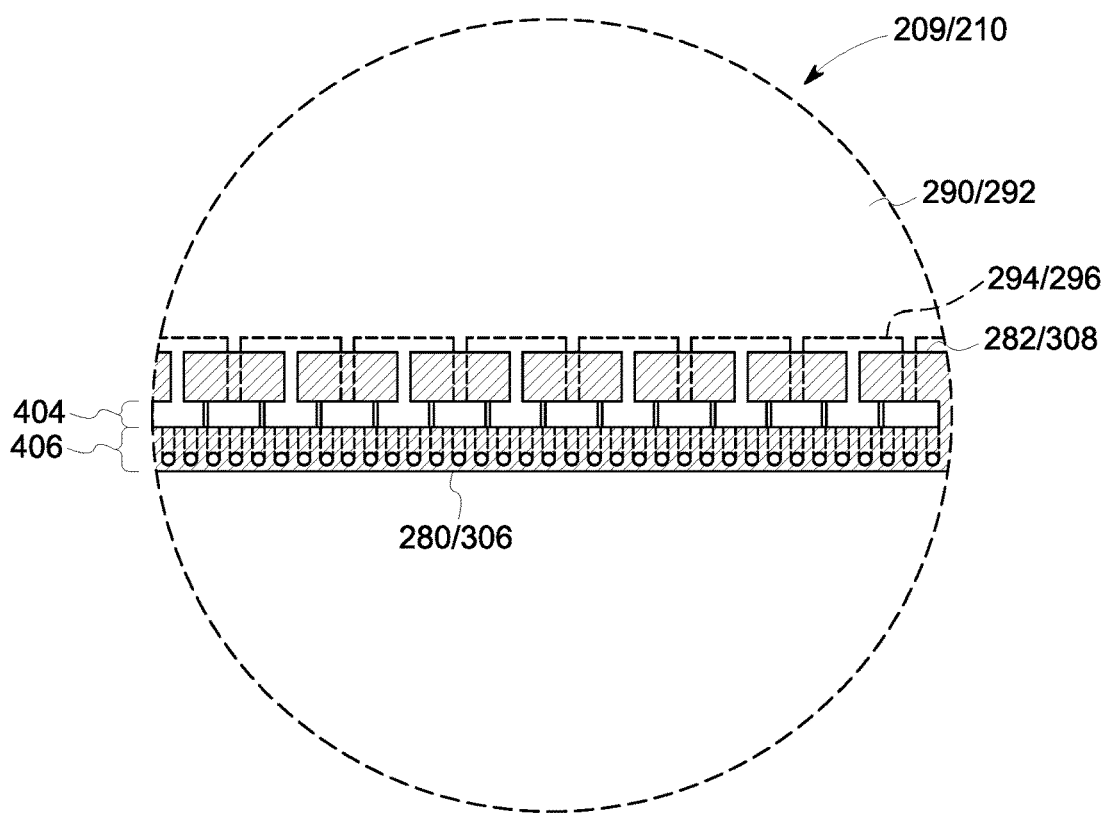
FIG. 4 is a cross-sectional view of a magnified portion of the airfoil shown in FIG. 3.

FIG. 4 is a cross-sectional view of a magnified portion of airfoil 206 (shown in FIG. 3). More specifically, FIG. 4 is a cross-sectional view of detail view A (shown in FIG. 3) of pressure sidewall 210 of airfoil sidewall 209. Disposed between outer surface 280/306 and inner surface 282/308 is a series of internal cooling passages, described in more detail below, configured to distribute a coolant stream within airfoil sidewall 209. The internal cooling passages generally include microchannels 406 disposed adjacent outer surface 280/306 and channels 404 disposed between outer surface 280/306 and inner surface 282/308. Channels 404 are configured to be in fluid communication with one or more plenums of a manifold, such as feed plenum 292 of feed manifold 290 and return plenum 296 of return manifold 294. As described in more detail in FIGS. 6 and 7, each of microchannels 406, channels 404, and plenums 292/296 are in fluid communication with each other and are configured to form a capillary-like structure for distributing a stream of coolant within airfoil sidewall 209. Airfoil 206 is used as the exemplary embodiment of a turbomachinery component including internal cooling passages in accordance with this disclosure. Alternatively, any turbomachinery component may be cooled using such internal cooling passages including, without limitation, turbine and compressor casings, end walls, shrouds, guide vanes, and nozzles.

Figure 5:
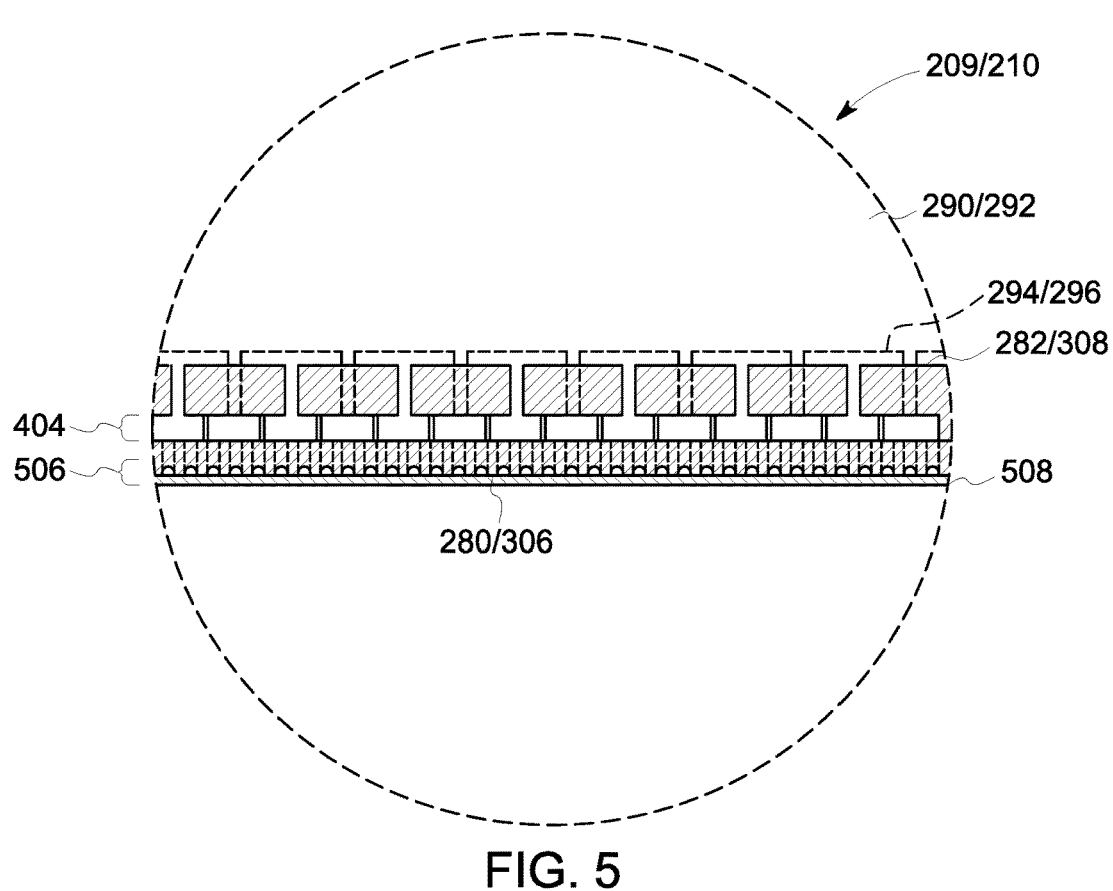
FIG. 5 is a cross-sectional view of an alternative magnified portion of the airfoil shown in FIG. 3.

FIG. 5 is a cross-sectional view of an alternative magnified portion of airfoil 206 (shown in FIG. 3). More specifically, FIG. 5 is a schematic cross-sectional view of an alternative magnified portion of pressure sidewall 210 of airfoil sidewall 209 corresponding to detail view A (shown in FIG. 3). In the alternative magnified portion of airfoil 206, microchannels 506 are at least partially defined by an outer layer 508. Specifically, microchannels 506 are formed by first machining outer surface 280 of airfoil sidewall 209 to partially define microchannels 506. Outer layer 508 is then placed over the partially defined microchannels and secured in place, thereby completing definition of microchannels 506. In certain embodiments, outer layer 508 is a pre-sintered preform ("PSP"). In such embodiments, the PSP is first shaped using any suitable method to fit over the partially defined microchannels. Once formed, the PSP is juxtaposed substantially over the partially defined microchannels and bonded to airfoil sidewall 209 by, for example, a brazing process.

In alternative embodiments of turbomachinery components according to this disclosure, microchannels, such as microchannels 506, are formed, at least in part, by techniques other than machining and application of a PSP. In certain alternative embodiments, for example, microchannels are formed during casting of a turbomachinery component sidewall. In other alternative embodiments, microchannels are formed by additive manufacturing of the turbomachinery component sidewall. As used herein, "additive manufacturing" refers to any process which results in a three-dimensional object and includes a step of sequentially forming the shape of the object one layer at a time. Additive manufacturing processes include, for example, three dimensional printing, laser-net-shape manufacturing, direct metal laser sintering (DMLS), direct metal laser melting (DMLM), selective laser sintering (SLS), plasma transferred arc, freeform fabrication, and the like. One exemplary type of additive manufacturing process uses a laser beam to sinter or melt a powder material. Additive manufacturing processes can employ powder materials or wire as a raw material. Moreover, additive manufacturing processes can generally relate to a rapid way to manufacture an object (article, component, part, product, etc.) where a plurality of thin unit layers are sequentially formed to produce the object. For example, layers of a powder material may be provided (e.g., laid down) and irradiated with an energy beam (e.g., laser beam) so that the particles of the powder material within each layer are sequentially sintered (fused) or melted to solidify the layer.

Figure 6:
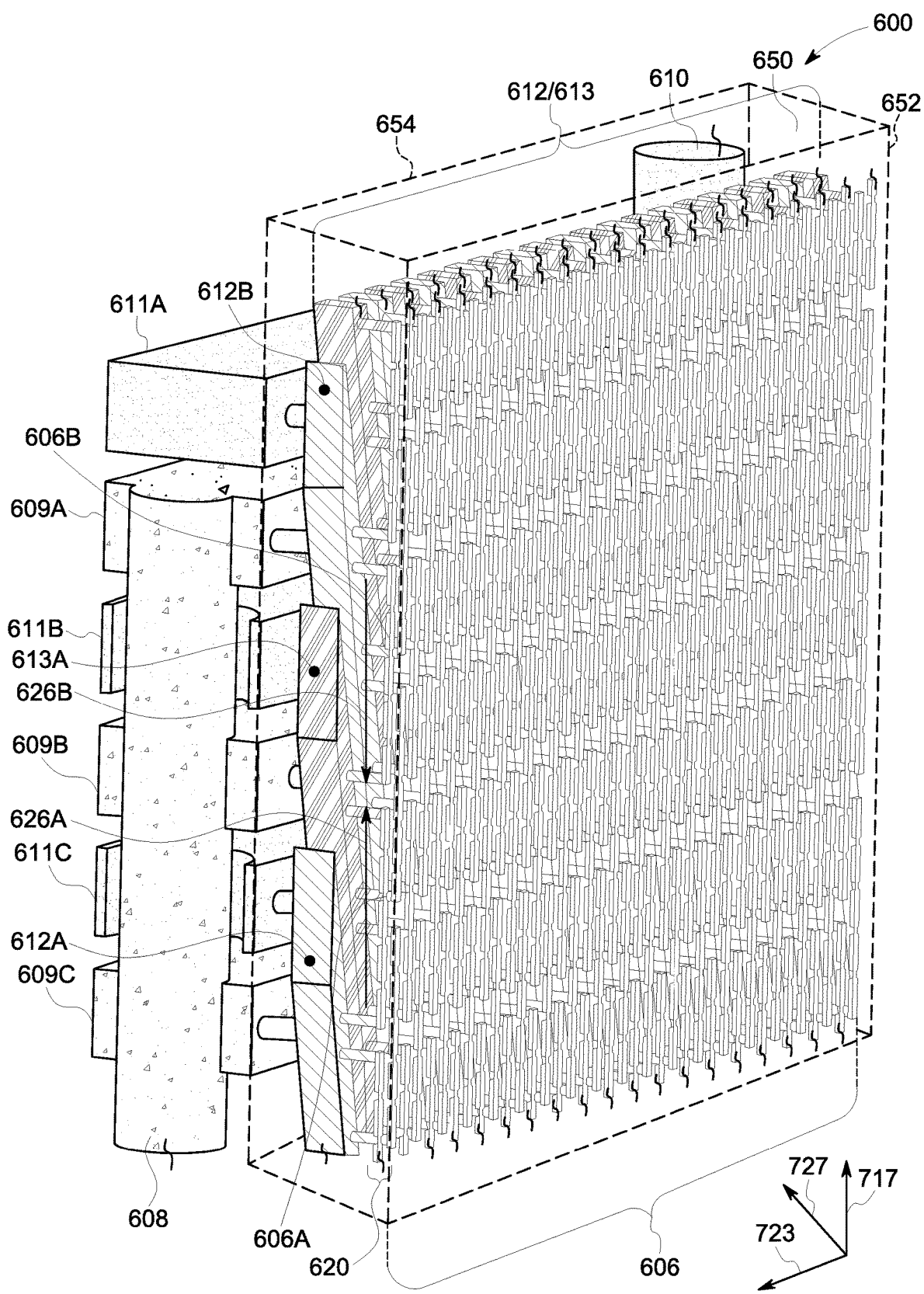
FIG. 6 is a first isometric view of an exemplary turbomachinery component sidewall portion that may be used in the airfoil of FIG. 3.
Figure 7:
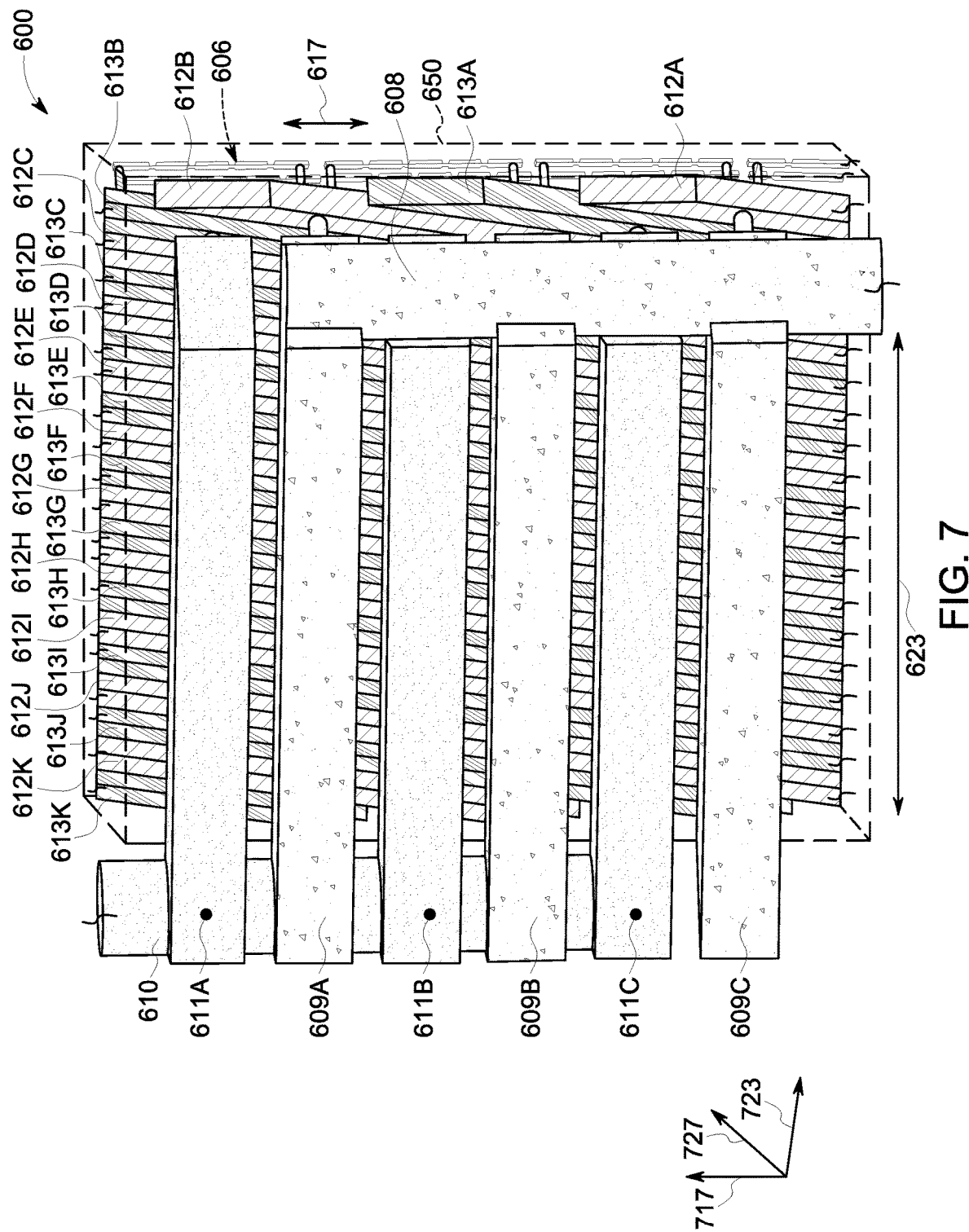
FIG. 7 is a second isometric view of the turbomachinery component sidewall portion shown in FIG. 6.

FIGS. 6 and 7 depict isometric views of cooling passages of an exemplary portion of a turbomachine component sidewall. For clarity and to facilitate explanation of FIGS. 6 and 7, different fill patterns have been applied to similar components.

FIGS. 6 and 7 are first and second isometric views of an exemplary turbomachine component sidewall portion 600 (also referred to herein as "component sidewall portion 600"), respectively. In certain embodiments, component sidewall portion 600 is a portion of an airfoil sidewall, such as airfoil sidewall 209 (shown in FIG. 3). In the exemplary embodiment, component sidewall portion 600 is representative of a larger component sidewall including a broader network of cooling passages and may correspond to one or more portions of the turbomachinery component. For example, in embodiments in which turbomachinery component sidewall portion 600 corresponds to a portion of an airfoil sidewall, such as airfoil sidewall 209 (shown in FIG. 3), component sidewall portion 600 may correspond to any portion of the airfoil sidewall, including one or more of a pressure sidewall, a suction sidewall, a leading edge, and a trailing edge, such as pressure sidewall 210, suction sidewall 212, leading edge 220, and trailing edge 222, respectively (each shown in FIG. 3).

Component sidewall portion 600 includes a turbomachinery component sidewall 650 (also referred to herein as "component sidewall 650") that defines microchannels 606. Microchannels 606 are generally disposed adjacent an outer surface 652. Component sidewall 650 further includes channels 612/613 disposed between an inner surface 654 and outer surface 652. Component sidewall portion 600 also includes a feed manifold 608 including feed plenums 609A-C and a return manifold 610 including return plenums 611A-C. Component sidewall 650 further includes channels 612/613 between inner surface 654 and outer surface 652.

In the exemplary embodiment, microchannels 606 extend along a radial length 617 (shown in FIG. 7) in a radial direction 717. Each of feed plenums 609A-C and return plenums 611A-C extend along a longitudinal length 623 (shown in FIG. 7) in a longitudinal direction 723. Component sidewall 209 also includes feed channels 612A-K and return channels 613A-K. Each of feed channels 612A-K and return channels 613A-K extend along a respective oblique length defined in an oblique direction 727 that is oblique relative to the radial direction 717 and the longitudinal direction 723.

During operation, a stream of coolant is provided to feed manifold 608 and distributed between each of feed plenums 609A-C. The coolant stream passes from feed plenums 609A-C to feed channels 612A-K. From feed channels 612A-K, the coolant stream is delivered to microchannels 606. As the coolant stream passes through feed channels 612A-K and microchannels 606, the coolant stream exchanges heat with component sidewall 650. The coolant stream, warmed due to the heat exchange, is then reclaimed from microchannels 606 by retuning the coolant stream to return manifold 610 via return channels 613A-K and return plenums 611A-C. From return manifold 610, the warmed coolant stream is generally directed out of component sidewall 650 into a coolant return system (not shown). In certain embodiments in which the turbomachinery component is an airfoil, the warmed coolant stream is directed into an internal airfoil volume, such as internal airfoil volume 284 (shown in FIG. 3) and exits through fluid passages in a portion of the turbomachinery component, such as trailing edge section 300 of airfoil 206 (both shown in FIG. 3).

Microchannels 606 are generally arranged into radially extending microchannel rows, such as microchannel row 620 (shown in FIG. 6). In the exemplary embodiment, adjacent microchannels in a given microchannel row are configured to direct a portion of the coolant stream in opposite directions relative to each other. For example the stream of coolant generally passes through a first microchannel 606A in a first direction 626A and through a second microchannel 606B, which is adjacent first microchannel 606A within microchannel row 620, in a second direction 626B opposite first direction 626A (all shown in FIG. 6).

In the exemplary embodiment, counter flow in adjacent microchannels within particular microchannel rows, such as microchannel row 620, is achieved, in part, by the arrangement of feed plenums 609A-C, return plenums 611A-C, feed channels 612A-K, and return channels 613A-K. For example, in the exemplary embodiment feed plenums 609A-C are interdigitated with return plenums 611A-C and feed channels 612A-K are interdigitated with return channels 613A-C. Such an arrangement facilitates adjacent microchannels receiving fresh coolant from different feed channels or delivering warmed coolant to different return channels. For example, first microchannel 606A is configured to receive a portion of the coolant stream from feed channel 612A while second microchannel 606B is configured to receive a portion of the coolant stream from feed channel 612B. However, both of first microchannel 606A and second microchannel 606B are configured to return warmed portions of the coolant stream to return channel 613A.

In the exemplary embodiment, each type of internal cooling passage has a consistent cross-sectional area. For example, each feed plenum 609A-C and each return plenum 611A-C have the same cross-sectional area. In alternative embodiments, individual plenums, channels, and microchannels may vary in one or more dimensions from other plenums, channels, and microchannels, respectively. For example, in an alternative embodiment, microchannels located in a first portion of a component sidewall prone to high gas temperatures have a larger diameter than microchannels in a second portion of the component sidewall in which gas temperatures are lower, thereby facilitating increased coolant flow in the first sidewall portion.

Microchannels, channels, and plenums in accordance with this disclosure are not limited to particular cross-sectional shapes nor are individual microchannels, channels, and plenums limited to a single cross-sectional shape. For example, microchannels, channels, and plenums in accordance with certain embodiments may have cross-sectional shapes that are, without limitation, one or more of circular, semi-circular, square, rectangular, trapezoidal, and any other suitable shape.

The lengths of individual plenums, channels, and microchannels of embodiments of this disclosure may vary. For example, in certain alternative embodiments, microchannels located in a first portion of a sidewall of a turbomachinery component prone to high gas temperatures are shorter and arranged more densely than microchannels in a second portion of the sidewall in which gas temperatures are lower. Accordingly, the rate at which coolant is exchanged within the shorter, more densely arranged microchannels is increased, facilitating increased cooling of the first sidewall portion. Similarly, plenums, channels, and microchannels in embodiments of this disclosure are not limited to following a substantially straight path, as in the exemplary embodiment. In alternative embodiments, plenums, channels, and microchannels may have one or more sections, each of which may follow different paths. Suitable paths may include, without limitation, straight paths, arcuate paths, and angular paths. In another alternative embodiment, plenums, channels, and microchannels may be oriented to substantially conform to one or more surfaces of a turbomachinery component.

The orientation of plenums, channels, and microchannels shown in FIGS. 6 and 7 are according to the exemplary embodiment. Alternatively, any suitable orientation of plenums, channels, and microchannels may be used to provide cooling of a turbomachinery component in accordance with this disclosure. For example, in one alternative embodiment, plenums, such as plenums 609A-C and 611A-C (shown in FIGS. 6 and 7), extend in a substantially radial direction, such as radial direction 717 (shown in FIGS. 6 and 7) and microchannels, such as microchannels 606 (shown in FIGS. 6 and 7) extend in a substantially longitudinal direction, such as longitudinal direction 723 (shown in FIGS. 6 and 7).

Figure 8:
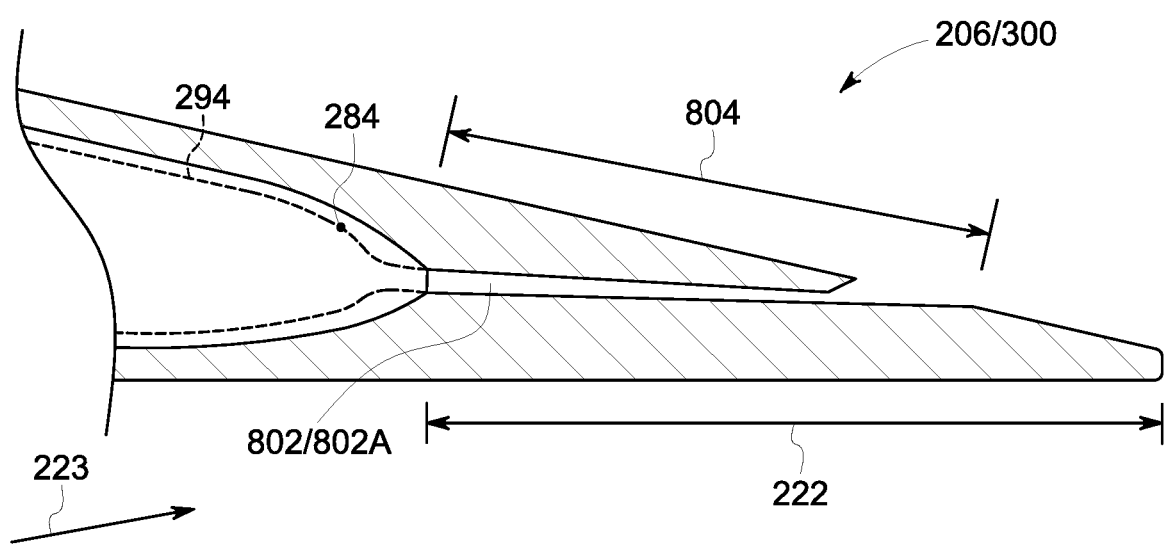
FIG. 8 is a cross-sectional view of a trailing edge section of the airfoil shown in FIG. 3.

FIG. 8 is a cross-sectional view of trailing edge section 300 of airfoil 206 (shown in FIG. 3). In certain embodiments, trailing edge 222 may define a second set of microchannels 802, including trailing edge microchannel 802A, configured to facilitate fluid communication between internal airfoil volume 284 and an environment external to airfoil 206. For example, during operation coolant fluid may be provided through fluid passages, such as fluid passage 806, defined by return manifold 294 such that as a stream of coolant enters return manifold 294, at least a portion of the stream of fluid passes through fluid passage 806 into internal airfoil volume 284. Each microchannel of the second set of microchannels generally extends through trailing edge 222 from internal airfoil volume 284 to the external environment. In the exemplary embodiment of FIG. 8, each microchannel of the second set of microchannels extends along a longitudinal length 804 defined in longitudinal direction 223.

The above-described system provides an efficient approach for removing heat and cooling turbomachinery components. In the exemplary embodiment, the turbomachinery component is an airfoil of a gas turbine engine. The airfoil includes an airfoil sidewall that further includes an inner surface and an outer surface opposite the inner surface. The airfoil sidewall defines a plurality of feed channels and a plurality of return channels and further includes a feed manifold adjacent the inner surface. The feed manifold is configured to receive a coolant stream therein and defines a plurality of feed plenums that are in fluid communication with the plurality of feed channels. The airfoil sidewall also includes a return manifold defining a plurality of return plenums in fluid communication with the return channels. The airfoil sidewall also defines a plurality of microchannels adjacent the outer surface, each microchannel of the plurality of microchannels in fluid communication with one feed channel and one return channel. During operation, cooling is achieved by providing a stream of coolant to each of the plurality of microchannels. More specifically, a stream of coolant is provided to the feed manifold and directed to each microchannel via the feed plenums and feed channels. The stream of coolant is then returned from the microchannels to the return manifold via the return channels and return plenums. An airfoil is used as the exemplary embodiment of a turbomachinery component including a cooling system according to this disclosure. Alternatively, any turbomachinery component may be cooled using such a cooling system including, without limitation, turbine and compressor casings, end walls, shrouds, guide vanes, and nozzles.

An exemplary technical effect of the system and methods described herein includes at least one of: (a) removing heat from a turbomachine component that includes an airfoil; (b) improving heat removal in high-temperature sections of the airfoil prone to high temperatures by facilitating placement of microchannels in the high-temperature sections; (c) reducing induced temperature gradients by facilitating rapid reclamation of warmed coolant fluid from the microchannels; (d) reducing the overall volume of coolant required to remove heat from the airfoil by efficiently distributing coolant within the airfoil sidewall; and (e) increasing overall turbomachine efficiency.

Exemplary embodiments of a system for cooling turbomachine components are described above in detail. The system is not limited to the specific embodiments described herein, but rather, components of systems may be utilized independently and separately from other components described herein. For example, the system may also be used in combination with other turbine components, and are not limited to practice only with the gas turbine airfoils as described herein. Rather, the exemplary embodiment can be implemented and utilized in connection with many other gas turbine applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbomachinery component comprising:
   a feed manifold configured to receive a coolant stream therein, said feed manifold comprising a plurality of feed plenums;
   a return manifold comprising a plurality of return plenums; and
   a sidewall defining a plurality of feed channels and a plurality of return channels within said sidewall, said sidewall comprising:
   an inner surface; and
   an outer surface opposite said inner surface;
   wherein each feed channel of said plurality of feed channels is in fluid communication with at least one feed plenum of said plurality of feed plenums, wherein each return channel of said plurality of return channels is in fluid communication with at least one return plenum of said plurality of return plenums, wherein said sidewall at least partially defines a first plurality of microchannels each positioned between a respective feed channel of said plurality of feed channels and said outer surface, wherein each microchannel of said first plurality of microchannels is fluidly connected between the respective feed channel and a respective return channel of said plurality of return channels, wherein a first microchannel of said first plurality of microchannels is directly attached to a first feed channel of said plurality of feed channels and is directly attached to a first return channel of said plurality of return channels, wherein a second microchannel of said first plurality of microchannels is directly attached to a second feed channel of said plurality of feed channels and is directly attached to said first return channel, and wherein said first return channel is positioned between said first feed channel and said second feed channel.

2. The turbomachinery component in accordance with claim 1, wherein said outer surface comprises at least one pre-sintered preform that at least partially defines a portion of said first plurality of microchannels.

3. The turbomachinery component in accordance with claim 1, wherein said turbomachinery component is an airfoil, said airfoil defining a leading edge and a trailing edge opposite said leading edge, said leading edge and said trailing edge defining a longitudinal direction, said airfoil further comprising:
   a root portion; and
   a tip portion opposite said root portion, wherein said root portion and said tip portion define a radial direction, wherein said each microchannel extends along a respective radial length defined in the radial direction, said at least one feed plenum of said plurality of feed plenums and said at least one return plenum of said plurality of return plenums extends along a respective longitudinal length defined in the longitudinal direction, and said each feed channel and said each return channel extend along a respective oblique length defined in an oblique direction, wherein the oblique direction is oblique relative to the radial direction and the longitudinal direction.

4. The turbomachinery component in accordance with claim 1, wherein said turbomachinery component is an airfoil comprising:
   a root portion; and
   a tip portion opposite said root portion, said root portion and said tip portion defining a radial direction, wherein said first plurality of microchannels are arranged in at least one microchannel row that extends along a radial length defined in the radial direction, wherein said first microchannel is configured to channel a first stream of coolant therein in a first direction defined along the radial length, and wherein said second microchannel is configured to channel a second stream of coolant therein in a second direction, the second direction opposite the first direction.

5. The turbomachinery component in accordance with claim 1, wherein said turbomachinery component is an airfoil, said airfoil defining:
   an inner airfoil volume in fluid communication with said return manifold;
   a leading edge;
   a trailing edge opposite said leading edge; and
   a second plurality of microchannels in fluid communication with said inner airfoil volume, each microchannel of said second plurality of microchannels extending through said trailing edge.

6. The turbomachinery component in accordance with claim 5, wherein said leading edge and said trailing edge define a longitudinal direction and said each microchannel of said second plurality of microchannels extends along a respective longitudinal length defined in the longitudinal direction.

7. The turbomachinery component in accordance with claim 1, wherein said plurality of feed plenums are interdigitated with said plurality of return plenums and said plurality of feed channels are interdigitated with said plurality of return channels, and wherein a third microchannel of said first plurality of microchannels is directly attached to said first feed channel and is directly attached to a second return channel of said plurality of return channels.

8. The turbomachinery component in accordance with claim 1, wherein said first plurality of microchannels have a width between and inclusive of 100 microns (μm) and 3 millimeters (mm) and a depth between and inclusive of 100 μm and 3 mm.

9. A system for removing heat from a turbomachinery component, the turbomachinery component including a sidewall comprising an inner surface and an outer surface opposite said inner surface, a feed manifold configured to receive a coolant stream therein, the feed manifold including a plurality of feed plenums, and a return manifold including a plurality of return plenums, said system comprising:
   a plurality of feed channels defined within the sidewall; and
   a plurality of return channels defined within the sidewall;
   wherein each feed channel of said plurality of feed channels is in fluid communication with at least one feed plenum of the plurality of feed plenums, wherein each return channel of said plurality of return channels is in fluid communication with at least one return plenum of the plurality of return plenums, wherein said sidewall at least partially defines a first plurality of microchannels positioned between a respective feed channel of said plurality of feed channels and said outer surface, wherein each microchannel of said first plurality of microchannels is fluidly connected between the respective feed channel and a respective return channel of said plurality of return channels, wherein a first microchannel of said first plurality of microchannels is directly attached to a first feed channel of said plurality of feed channels and is directly attached to a first return channel of said plurality of return channels, wherein a second microchannel of said first plurality of microchannels is directly attached to a second feed channel of said plurality of feed channels and is directly attached to said first return channel, and wherein said first return channel is positioned between said first feed channel and said second feed channel.

10. The system in accordance with claim 9, further comprising at least one pre-sintered preform that at least partially defines a portion of said first plurality of microchannels.

11. The system in accordance with claim 9, wherein the turbomachinery component is an airfoil, the airfoil defines a leading edge and a trailing edge opposite the leading edge, the leading edge and the trailing edge defining a longitudinal direction, and the airfoil further includes a root portion and a tip portion opposite the root portion, the root portion and the tip portion defining a radial direction, wherein said each microchannel extends along a respective radial length defined in the radial direction, said at least one feed plenum of said plurality of feed plenums and said at least one return plenum of said plurality of return plenums extend along a respective longitudinal length defined in the longitudinal direction, and said each feed channel and said each return channel extend along a respective oblique length defined in an oblique direction, wherein the oblique direction is oblique relative to the radial direction and the longitudinal direction.

12. The system in accordance with claim 9, wherein the turbomachinery component is an airfoil, the airfoil including a root portion and a tip portion opposite the root portion, the root portion and the tip portion defining a radial direction, wherein said first plurality of microchannels is arranged in at least one microchannel row that extends along a radial length defined in the radial direction, wherein said first microchannel is configured to channel a first stream of coolant therein in a first direction defined along the radial length, and wherein said second microchannel is configured to channel a second stream of coolant therein in a second direction, the second direction opposite the first direction.

13. The system in accordance with claim 9, wherein the turbomachinery component is an airfoil and said sidewall further defines an inner airfoil volume in fluid communication with said return manifold, a leading edge, and a trailing edge opposite said leading edge, said system further comprising a second plurality of microchannels in fluid communication with the inner airfoil volume, wherein each microchannel of said second plurality of microchannels extends through the trailing edge.

14. The system in accordance with claim 13, wherein the leading edge and the trailing edge define a longitudinal direction and wherein said each microchannel of said second plurality of microchannels extends along a respective longitudinal length defined in the longitudinal direction.

15. The system in accordance with claim 9, wherein said plurality of feed plenums are interdigitated with said plurality of return plenums and said plurality of feed channels are interdigitated with said plurality of return channels, and wherein a third microchannel of said first plurality of microchannels is directly attached to said first feed channel and is directly attached to a second return channel of said plurality of return channels.

16. A turbomachine comprising:
a compressor;
a turbine rotatably coupled to said compressor;
a combustor coupled in flow communication with said compressor and said turbine; and
at least one turbomachinery component coupled to said turbine, said at least one turbomachinery component comprising:

a feed manifold configured to receive a coolant stream therein, said feed manifold defining a plurality of feed plenums;
a return manifold defining a plurality of return plenums; and
a sidewall defining a plurality of feed channels and a plurality of return channels within said sidewall, said sidewall comprising:
an inner surface; and
an outer surface opposite said inner surface;
wherein each feed channel of said plurality of feed channels is in fluid communication with at least one feed plenum of said plurality of feed plenums, wherein each return channel of said plurality of return channels is in fluid communication with at least one return plenum of said plurality of return plenums, wherein said sidewall at least partially defines a first plurality of microchannels positioned between a respective feed channel of said plurality of feed channels and said outer surface, wherein each microchannel of said first plurality of microchannels is fluidly connected between the respective feed channel and a respective return channel of said plurality of return channels, wherein a first microchannel of said first plurality of microchannels is directly attached to a first feed channel of said plurality of feed channels and is directly attached to a first return channel of said plurality of return channels, wherein a second microchannel of said first plurality of microchannels is directly attached to a second feed channel of said plurality of feed channels and is directly attached to said first return channel, and wherein said first return channel is positioned between said first feed channel and said second feed channel.

17. The turbomachine in accordance with claim 16, wherein said outer surface comprises at least one pre-sintered preform that at least partially defines a portion of said first plurality of microchannels.

18. The turbomachine in accordance with claim 16, wherein said at least one turbomachinery component is an airfoil, said airfoil further defining a leading edge and a trailing edge opposite said leading edge, wherein said leading edge and said trailing edge define a longitudinal direction, said airfoil further comprising:
a root portion; and
a tip portion opposite said root portion, wherein said root portion and said tip portion define a radial direction, wherein said each microchannel extends along a respective radial length defined in the radial direction, said at least one feed plenum of said plurality of feed plenums and said at least one return plenum of said plurality of return plenums extends along a respective longitudinal length defined in the longitudinal direction, and said each feed channel and said each return channel extend along a respective oblique length defined in an oblique direction, wherein the oblique direction is oblique relative to the radial direction and the longitudinal direction.

19. The turbomachine in accordance with claim 16, wherein said at least one turbomachinery component is an airfoil, said airfoil comprising:
a root portion; and
a tip portion opposite said root portion, said root portion and said tip portion defining a radial direction, wherein said first plurality of microchannels are arranged in at least one microchannel row that extends along a radial length defined in the radial direction, wherein said first microchannel is configured to channel a first stream of coolant therein in a first direction defined along the radial length, and wherein said second microchannel is configured to channel a second stream of coolant therein in a second direction, the second direction opposite the first direction.

20. The turbomachine of claim 16, wherein said turbomachinery component is an airfoil, said sidewall further defining an inner airfoil volume in fluid communication with said return manifold, a leading edge, and a trailing edge opposite said leading edge, said leading edge and said trailing edge defining a longitudinal direction, said at least one airfoil further comprising a second plurality of microchannels in fluid communication with said inner airfoil volume, each microchannel of said second plurality of microchannels extending through said trailing edge along a respective longitudinal length defined in the longitudinal direction.

* * * * *